J. Sawyer,
Excavator,
N° 652, Patented Mar. 23, 1838
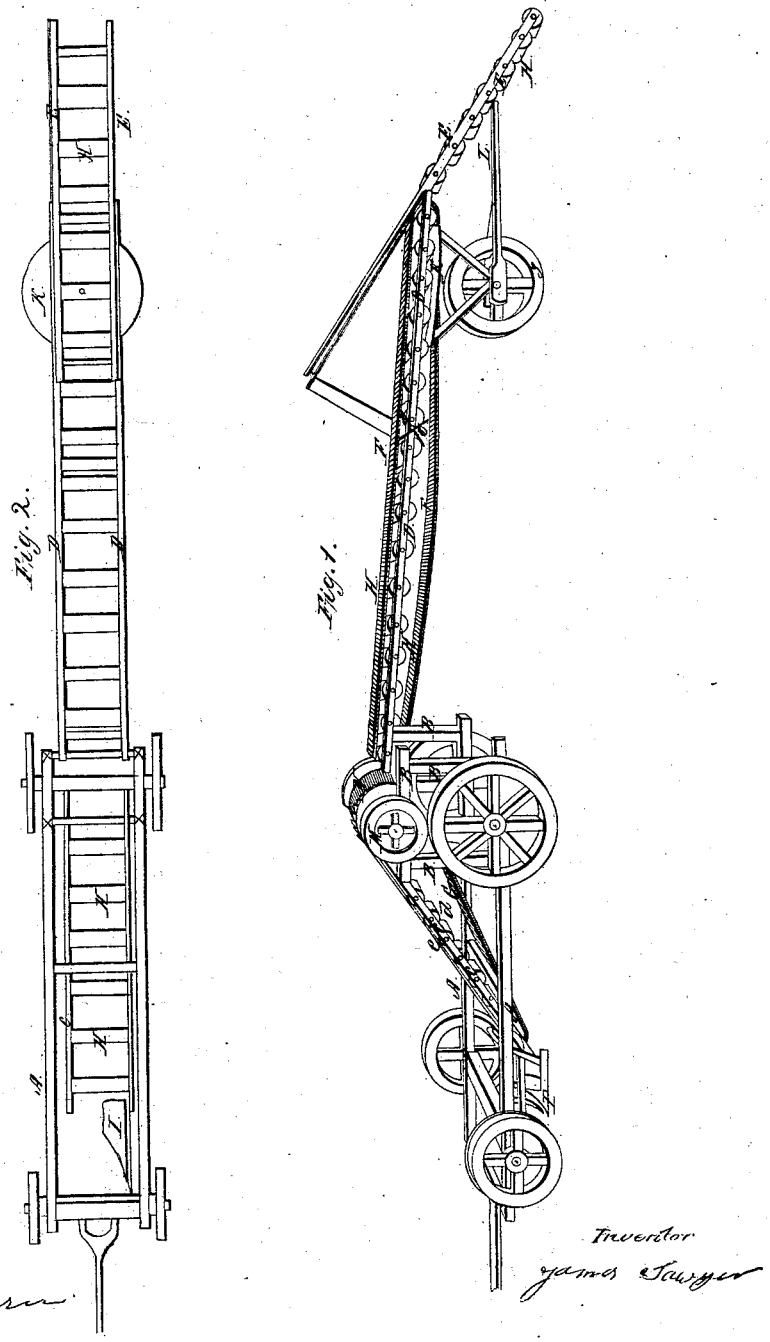

UNITED STATES PATENT OFFICE.

JAMES SAWYER, OF NEW YORK, N. Y.

MACHINE FOR EXCAVATING AND REMOVING EARTH IN MAKING PRAIRIE-FENCES.

Specification of Letters Patent No. 652, dated March 23, 1838.

*To all whom it may concern:*

Be it known that I, JAMES SAWYER, of the city, county, and State of New York, have invented a new and useful Machine for Making Turf Fences and other Similar Purposes, and that the following is a full and exact description.

This invention is called "James Sawyer's Prairie Fence Machine" and the nature of it consists in conveying the turf cut by a plow directly upon the spot where it is wanted, without stopping the plow or breaking the turf.

To enable others to make and use my invention I will proceed to describe its construction and operation.

A carriage is made with four wheels, with an oblong quadrangular frame—the two hind wheels about six feet in diameter. See drawing, hereunto annexed Figure 1.

Over the hind axle of this carriage a frame is built up (see B) which supports a shaft having upon it a wheel at each end (called the friction wheel and marked M) and a drum (N) in the middle. Upon the front part of this frame rests one end of the elevator C. Upon the hind part is attached by a bolt (which will permit it to vibrate) an inclined plane (D). The other end of this plane rests upon a circular swivel K. Attached to the extreme end of the inclined plane is the delivering plane E, so arranged that the end of it can be raised or depressed by turning the windlass at O.

The elevator consists of a frame (C) having between its outside timbers rollers over which passes an endless chain or band. The upper end is firmly attached to the frame B and the lower end rests upon a cross bar in the frame. The upper part of the band of the elevator passes over the drum N.

The inclined plane consists in a long frame D having rollers between the outside timbers and an endless chain or band passing over and beneath it.

The delivering plane E is for the purpose of allowing the turf to run off the inclined plane at any required height from the ground. It is made of two timbers framed together with cross bars, and having rollers, like the inclined plane.

The drum, which carries the elevating band or chain is moved by the wheels M which ride upon the top of the two large wheels and are carried around by means of the friction between them. The drum must always be of the same size with the wheels M in order that the motion of the elevating band G may be the same as that of the whole machine, in other words, that the turf may be carried up on the machine as fast as it is cut.

The length of the whole machine may be forty or fifty feet and the height from seven to ten.

The plow, which is generally a large one, and so made that it will not turn the turf over, is attached to the forward axle.

The machine being put in motion (which is generally done by oxen) on the line in which the turf fence is to be made, the plow cuts a clean furrow and raises a turf of any required size (say eighteen wide and five thick). This turf passes over the mold board to the elevator. This, which is in motion whenever the plow moves ahead takes the turf up the elevation and over the drum N to the inclined plane. The turf then passes along by its own weight and the former impulse, down the inclined plane and upon the delivering plane, whence it is laid in the required line. Any number of courses are laid in a similar manner, the delivering plane being elevated, as the fence progresses in height by the windlass O. As the furrows are cut farther and farther from the fence, the inclined plane, with the delivering plane attached is vibrated toward the fence by means of the wheel I, which is turned by the lever L on a swivel.

When it is desirable a drum can be made upon the axle of the large wheels and made to drive the drum N by means of a band or intermediate drums.

What I claim as my invention and desire to secure by Letters Patent is—

1. The delivering plane, and its arrangement for depositing the turf upon the fence at any required height.

2. I claim the arrangement by which the inclined plane vibrates, so that the turf can be delivered upon the fence, although the main carriage and plow may be running twenty feet distant from it.

3. I claim the combination of the endless chain or band F with the delivering plane and the excavator and elevator in the manner above described.

JAMES SAWYER.

Witnesses:
OWEN G. WARREN,
L. F. WARREN.